(12) United States Patent
Tateoka

(10) Patent No.: US 7,859,127 B2
(45) Date of Patent: Dec. 28, 2010

(54) GENERATING METHOD AND GENERATING SYSTEM UTILIZING COMBUSTION EXHAUST GAS

(76) Inventor: Tetsuji Tateoka, 674, Maruko-dohri 2-chome, Nakahara-ku, Kawasaki-shi, Kanagawa (JP)

( * ) Notice: Subject to any disclaimer, the term of this patent is extended or adjusted under 35 U.S.C. 154(b) by 598 days.

(21) Appl. No.: 11/921,172

(22) PCT Filed: Jun. 16, 2006

(86) PCT No.: PCT/JP2006/312117

§ 371 (c)(1),
(2), (4) Date: Nov. 28, 2007

(87) PCT Pub. No.: WO2007/148369

PCT Pub. Date: Dec. 27, 2007

(65) Prior Publication Data

US 2009/0278360 A1    Nov. 12, 2009

(51) Int. Cl.
    *F01D 15/10*    (2006.01)
(52) U.S. Cl. ............ 290/52; 290/1 A; 60/608; 60/784
(58) Field of Classification Search .......... 290/52, 290/1 A; 60/784, 608
    See application file for complete search history.

(56) References Cited

U.S. PATENT DOCUMENTS

| | | | |
|---|---|---|---|
| 5,811,201 A | 9/1998 | Skowronski | |
| 6,313,544 B1 * | 11/2001 | Mongia et al. | 290/52 |
| 6,408,625 B1 * | 6/2002 | Woon et al. | 60/608 |
| 6,934,621 B2 * | 8/2005 | Bhargava et al. | 701/108 |
| 7,382,061 B2 * | 6/2008 | Ferraro | 290/52 |
| 2002/0095939 A1 * | 7/2002 | Gordon et al. | 60/784 |

FOREIGN PATENT DOCUMENTS

| | | |
|---|---|---|
| JP | 62-067235 | 3/1987 |
| JP | 05-280359 | 10/1993 |
| JP | 2005-127203 | 5/2005 |
| JP | 2005-226501 | 8/2005 |

OTHER PUBLICATIONS

International Search Report for PCT/JP2006/312117 and its partial English translation.
International Preliminary Examination Report for PCT/JP2006/312117 and its partial English translation.

* cited by examiner

*Primary Examiner*—Michael C Zarroli
(74) *Attorney, Agent, or Firm*—Edwards Angell Palmer & Dodge LLP

(57) ABSTRACT

Gas pressure and exhaust heat of the combustion exhaust gas exhausted from the internal combustion engine is effectively utilized for generating electricity.

Using a turbocharger (8) having a turbine (4) that is driven by gas pressure of the combustion exhaust gas and a compressor (6) that is driven by rotational force generated in the turbine, an air engine (12) generating rotational force by air pressure as a power source, and a generator (14) converting the rotational force generated by the air engine to electric power, the air inspired from outside is compressed by the compressor of the turbocharger and heated by the turbine heat at high temperature, and electricity is generated by the generator using the generated compressed air of high pressure and high temperature as a power source of the air engine. The compressed air thus generated in the turbocharger (8) is shared and distributed for combusting the internal combustion engine (2) and for driving the air engine (12).

20 Claims, 4 Drawing Sheets

GENERATING METHOD AND GENERATING SYSTEM UTILIZING COMBUSTION EXHAUST GAS

BACKGROUND OF THE INVENTION

1. Field of the Invention

The present invention relates to a generating method and a generating system utilizing combustion exhaust gas to effectively use gas pressure and exhaust heat of combustion exhaust gas discharged from internal combustion engines.

2. Background of the Invention

Recently, internal combustion engines (engines) have increasingly installed supercharging devices such as turbochargers and supercharger to obtain large power output in case of necessity.

The turbocharger effectively utilizes exhaust gas pressure of exhaust gas that has been wasted in conventional naturally-aspirated engines. And the turbocharger is a supercharging device that provides rotational force to shafts by a force of combustion exhaust gas of the engine, thereby rotating a coaxial compressor to increase amount of intake air. Although 30% to 40% energy of fuel is wasted in the air as combustion exhaust gas in general engines, energy of this exhaust gas is utilized to increase power without increasing exhaust emission volume.

On the other hand, the supercharger is a mechanical charger that uses engine power itself whereas the turbocharger uses the exhaust turbine. In the supercharger, an engine and a compressor are linked with a belt and rotation drives the compressor to deliver the compressed air to the engine. Over the exhaust turbine, it has advantages including high responsiveness, low deterioration of fuel efficiency, and operability from the middle-rotation region. On the other hand, it has disadvantages including more loss in the high rotation region because the compressor is driven by the engine power and lower compression pressure than that of the turbocharger.

In the turbocharger, the exhaust gas emitted from the engine is introduced into a turbine case to cause the turbine to rotate at high speed and then the exhaust gas is emitted outside. The compressor coaxial with a turbine shaft is rotationally driven due to turbine rotation and the air inducted from the outside is compressed. The high-temperature air thus compressed is sent to an intercooler and cooled to increase air density. Subsequently the air is forced into an engine cylinder in a high density state and explosive burning with fuel produces high engine power output.

The engine power output increases in proportion to three factors "explosive force", "emission volume", and "engine rotational speed". Therefore, the higher explosive pressure obtains the higher power output in comparison with the engines having the same emission volume and rotational speed. Although the explosive pressure is determined by various conditions, the higher boost pressure (pressure of the compressed air sent into the combustion chamber) increases the explosion pressure more. And even though the boost pressure is the same, the explosive pressure increases because the air volume (air density) increases as the intake-air temperature of the compressed air decreases.

Here in the turbine of the turbocharger, the intake air is compressed by rotating at extremely high speed of about 50000 rpm to 100000 rpm due to pressure of the combustion exhaust gas. And the temperature of the compressor adjacent to the turbine also becomes high because the turbine is exposed to the exhaust gas at high temperature appropriately 900° C. For this reason, the temperature of the compressed air compressed by the compressor becomes high as well.

The high-temperature compressed air is required to cool down before supplying the compressed air to the engine because density of the high-temperature air becomes low, and therefore an intercooler is used as a cooling device. By the air introduced from outside, the intercooler contactlessly cools down the compressed air erupting from the compressor of the turbocharger.

With respect to the invention relating turbochargers, invented are many devices disclosed for example in "A multicylinder-type gas engine provided with a turbocharger having generator motor" of Patent Document 1.

Patent Document 1: Japanese Unexamined Patent Publication No. JP-A-6-33780

SUMMARY OF THE INVENTION

Thus the turbocharger features that the engine emission volume can be reduced and weight can be reduced compared with the non-turbocharged engine having the same power output and the same engine rotational speed. Further, it has a superior characteristic that fuel-economy rate can be reduced because the low engine emission volume can reduce resistance due to friction of movable portions such as piston ring and piston cylinder liner.

Here, although the gas pressure of the combustion exhaust gas has been used for driving turbines, heat thereof has not been utilized but only discharged outside as exhaust gas.

The present invention is made to solve the above described problems. That means the object of the present invention is to provide a generating method and a generating system utilizing combustion exhaust gas that can improve energy efficiency by utilizing heat of the combustion exhaust gas and heat generated in superchargers that have been wastefully discharged.

A generating method utilizing combustion exhaust gas of the present invention that uses a turbocharger (8) having a turbine (4) that is driven by gas pressure of combustion exhaust gas of an internal combustion engine (2) and a compressor (6) that is driven by rotational force generated by the turbine and compresses air inspired from outside, an air engine (12) generating rotational force by air pressure as a power source, and a generator (14) converting the rotational force thus generated by the air engine to electric power comprises steps of compressing the air inspired from the outside by the compressor of the turbocharger and heating the air by the turbine heat at high temperature, further raising temperature heat of the compressed air thus generated by the turbocharger by utilizing the combustion exhaust gas exhausted from the internal combustion engine, inside a driving air supply pipe (16) that leads the compressed air to the air engine, subsequently leading the compressed air to the air engine as a power thereof, and generating electricity by the generator.

It is also preferable that the compressed air generated in the turbocharger (8) is shared and distributed for use of combusting the internal combustion engine (2) and for driving the air engine (12).

Further it is preferable that in a driving air supply pipe (16) for leading the compressed air to the air engine (12), temperature of the compressed air generated in the turbocharger (8) is raised using combustion exhaust gas exhausted from the internal combustion engine (2).

Further it is preferable that a small amount of water is introduced from the outside into the inside of the driving air supply pipe (16).

A generating system utilizing combustion exhaust gas of the present invention comprises a turbocharger (8) having a turbine (4) that is driven by gas pressure of combustion exhaust gas of an internal combustion engine (2) and a compressor (6) that is driven by rotational force generated by the turbine and compresses air inspired from outside, an air engine (12) that converts air pressure supplied from an driving air supply pipe (16) for leading the compressed air generated in the turbocharger to rotational force, and a generator (14) converting the rotational force generated by the air engine to electric power, and a heating mechanism (22) for raising temperature of the compressed air thus generated by the turbocharger by utilizing heat of the combustion exhaust gas exhausted from the internal combustion engine in a path of the driving air supply pipe.

It is also preferable that the system further comprises a combusting air supply pipe (18) for supplying the compressed air generated in the turbocharger (8) to the internal combustion engine (2) as a combusting air.

Further it is preferable that a heating mechanism (22) for raising temperature by utilizing heat of the combustion exhaust gas is provided in a path of the driving air supply pipe (16) for leading the compressed air generated in the turbocharger (8) to the air engine (12).

Specifically, the heating mechanism (22) is arranged in such manner that a driving air supply pipe (16) is adjacent to a manifold (24) for leading the combustion exhaust gas from the internal combustion engine (2) to the turbine (4) and that the combustion exhaust gas exhausted from the internal combustion engine (2) contacts the driving air supply pipe (6).

It is preferable according to necessity that the air engine (12) and the generator (14) are disposed apart, the rotational force generated by the air engine is transmitted to the generator by a belt drive or a shaft drive and that a chamber portion (26) for temporarily storing the compressed air at high temperature and high pressure is provided in a path of the driving air supply pipe (16).

According to the generating method utilizing the combustion exhaust gas and the generating system thereof of the present invention, the combustion exhaust gas is utilized, air inspired from outside to the turbocharger is compressed to boost gas pressure, thus compressed air utilizing heat of the combustion exhaust gas (actually further increases gas pressure) is expanded to utilize as a power source of the air engine, so that the air engine may be efficiently driven by high gas pressure and electricity may be efficiently generated by generated rotational force.

In the turbocharger for supplying the compressed air for combustion to the engine, it is not preferable that the compressed air itself becomes high temperature because air density decreases. For that reason, the compressed air is cooled by the intercooler before the compressed air is introduced to the engine. The present invention is provided to efficiently generate electricity by utilizing the compressed air at high temperature as it is.

The present invention is not limited to application to engines with turbocharger. The Electric may be generated for naturally-aspirated engines by providing turbochargers for exclusive use of electric generation.

Further in the present invention, the compressed air generated by the turbocharger is shared and distributed to the internal combustion engine as combusting air and the air engine as driving air, so that engine output may be improved and electricity may be efficiently generated at the same time.

Further the compressed air generated by the turbocharger is expanded by high-temperature exhaust gas discharged immediately after the engine combustion chamber (gas pressure is further increased), so that the air engine may be further efficiently driven.

Further a small amount of water is dropped or sprayed from outside into the driving air supply pipe in front to induce vapor explosion to improve volume and pressure of gas (the compressed air and water vapor) flowing inside the driving air supply pipe, so that energy for driving the air engine may be increased.

DESCRIPTION OF THE REFERENCE NUMERALS

Figure 1:
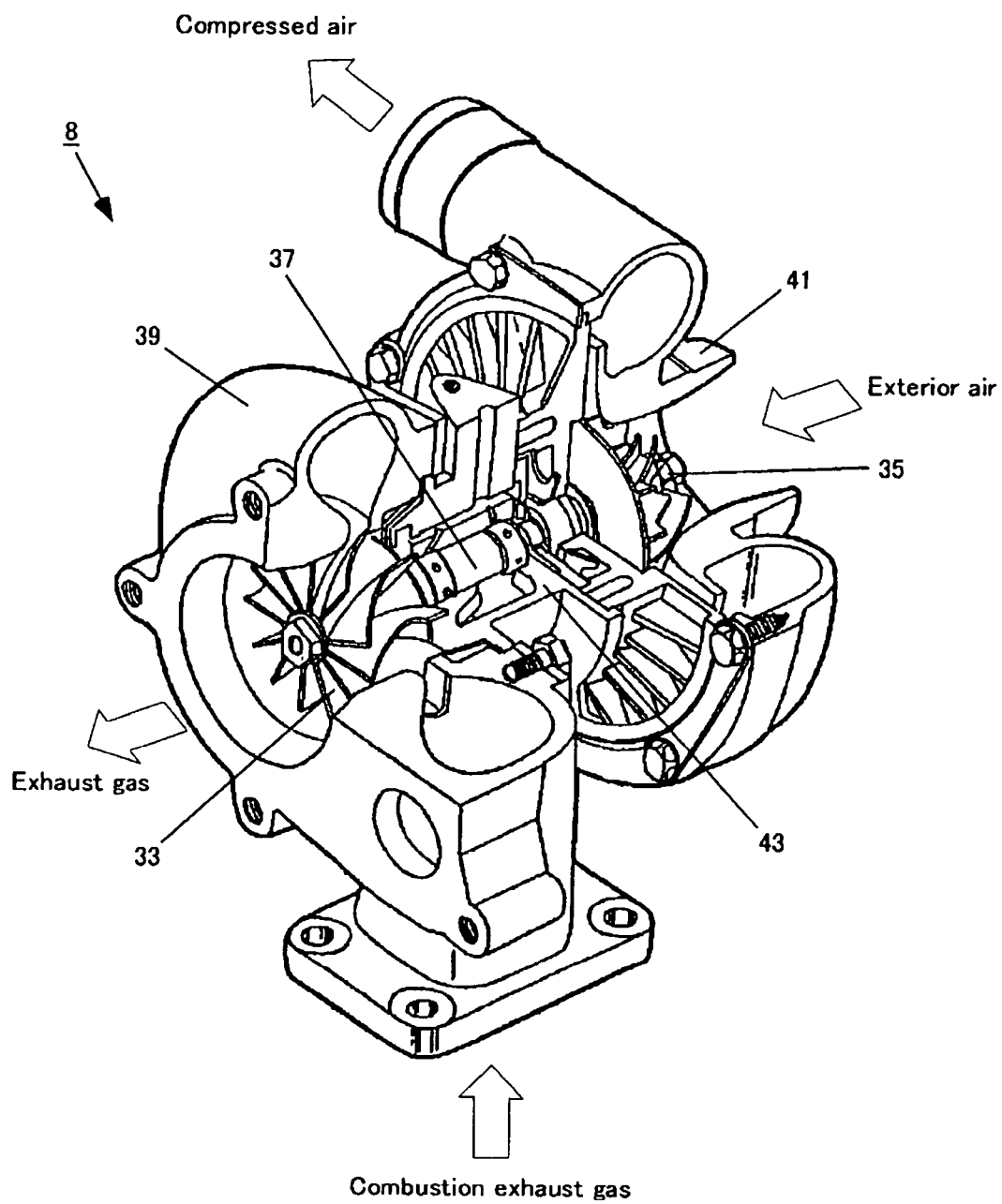
FIG. 1 A partially cross-sectional perspective view for explaining a structure of a turbocharger.

2 Internal combustion (engine)
4 Turbine
6 Compressor
8 Turbocharger
9 Generating system
12 Air engine
14 Driving air supply pipe
18 Combusting air supply pipe
22 Heating mechanism
24 Manifold
26 Chamber portion
31 Electric storage equipment
37 Shaft
39 Turbine housing
41 Compressor housing
43 Center housing
47 Shaft drive
49 Intercooler
51 Insulation material
53 Water tank
54 Water pipe
59 Pump

DESCRIPTION OF PREFERRED EMBODIMENT

Hereinafter, first exemplary embodiment of the present invention is described with reference to drawings. FIG. 1 is a partially cross-sectional perspective view for showing a structure of a turbocharger that is used a generating system utilizing combustion exhaust gas in the present invention.

A turbocharger 8 in FIG. 1 is substantially similar to general turbochargers and mainly includes a turbine wheel 33, a compressor wheel 35, a shaft 37 linking therewith, a turbine housing 39, a compressor housing 41, and a center housing 43 supporting the shaft 37.

The turbo wheel 33 inside the turbine housing 39 is rotated by gas pressure of the combustion exhaust gas from the exhaust manifold that leads the combustion exhaust gas discharged from a combustion chamber of an engine (internal combustion) and has a function of rotating the coaxial compressor wheel 35. The turbine wheel 33 is formed of ultra heat resistant alloys having high heat resistance and high durability because the turbine wheel 33 rotates while being exposed to high-temperature combustion exhaust gas of approximately 900° C.

Generally, the compressor wheel 35 inside the compressor housing 41 has functions of inspiring and compressing exterior air. The compressor wheel 35 that is not generally exposed to high temperature is formed of aluminum alloy and the like. However, it is formed of ultra heat resistant alloys similar to those of the turbine wheel 33 because the compressor is intentionally heated at high temperature in the present invention as described later.

The shaft 37 links the turbine wheel 33 and the compressor wheel 35 for rotating at ultra high speed during the operation, and is supported by full floating bearing in such manner that the bearing floats due to oil between the housing and the shaft 37 because the shaft rotates at ultrahigh speed (50000 rpm to 100000 rpm) during the operation. The shaft is formed of alloys having high heat conductivity, high heat resistance and high durability for efficiently transferring high temperature heat of the turbine wheel 33 to the compressor wheel 35. And the shaft is shorter than shafts of general turbochargers and the like.

The turbine housing 39 is adjacent to the compressor housing 41 and integrally formed so as to efficiently transfer heat from the turbine 4 to the compressor 6.

Embodiments of the generating method utilizing combustion exhaust gas and the generating system of the present invention that uses the turbocharger 8 described above are described below with reference to drawings.

Embodiment 1

Figure 2:
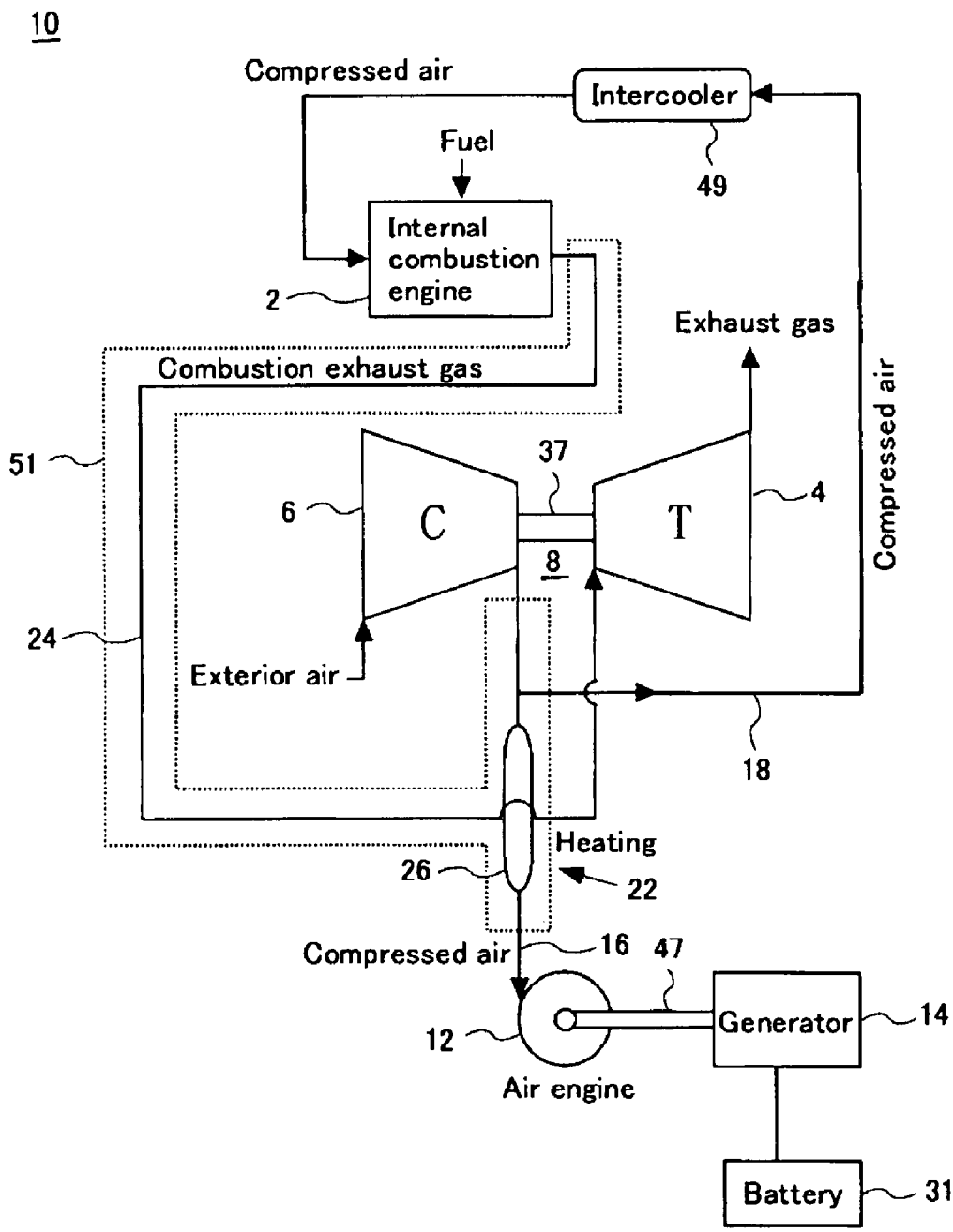
FIG. 2 A block diagram for explaining a configuration of a generating system utilizing combustion exhaust gas of Embodiment 1.

FIG. 2 is a schematic diagram for explaining a configuration of the generating system using combustion exhaust gas of Embodiment 1.

The generating system 10 shown in figures is mounted on vehicles such as hybrid passenger cars and trucks running by shifting an engine (internal combustion) and a motor. It is purposed to soup up engine by the turbocharger and exhausted heat of the combustion exhaust gas that has been conventionally wasted is efficiently utilized at the same time.

This generating system 10 includes the above mentioned turbocharger 8, an air engine 12, a generator 14, and electric storage equipment 31.

The air engine 12 is an air engine that drives by air pressure of compressed air as disclosed in e.g. Japanese Examined Patent Publication No. JP-B-3306053 and its explanatory website (http://homepage3.nify.com/miengns/p2/airengen.html), or a turbine that blows compressed air to a blade to rotate the blade by air pressure. The engine is not limited to these and other engines may be employed as long as rotational force is generated by gas pressure as a power source. The rotational force generated in the air engine 12 is transmitted to a shaft drive 47 to the generator 14.

Although the generator 14 is an alternator combining an AC generator and a rectifier, a DC generator may be employed. Shafts of the air engine 12 and the generator 14 may be directly connected by coupling, or speed gears (speed up, speed down) and the like may be interposed between shafts of the air engine and the generator to connect according to need.

The electric storage equipment 31 is purposed to store electricity generated in the generator 14 and it is a battery converting electric energy to chemical energy for storage. For this battery, a lithium-ion secondary battery and the like that have high energy density are employed.

The structure of the turbocharger 8 is as described before. As in the general turbocharger 8, the compressed air generated in a compressor 6 is led from a combusting air supply pipe 18 to an engine 2 through an intercooler 49 for cooling compress air of high pressure and high temperature, and it is also led to the air engine 12 through a driving air supply pipe 16 that is branched from the combusting air supply pipe 18. That means the compressed air generated in the compressor 6 is shared and distributed for combusting the engine 2 and for driving the air engine 12.

The driving air supply pipe 16 is entirely and tightly covered around with an insulation material 51 having heat resistance to prevent the compressed air heated and expanded (actually gas pressure being raised higher) inside the compressor 6 from releasing.

Further, a path of the driving air supply pipe 16 is provided with a chamber portion 26 that is formed by expanding a pipe diameter of the driving air supply pipe 16. This chamber portion 26 has a function to temporarily store compressed air of high pressure and high temperature and to save the compressed air as much as possible even if drive of the air engine 12 can not keep up with increased rotational number of the engine 2. Meanwhile it is not essential in the present invention that the chamber portion 26 is formed in the path of the driving air supply pipe 16.

Figure 3:
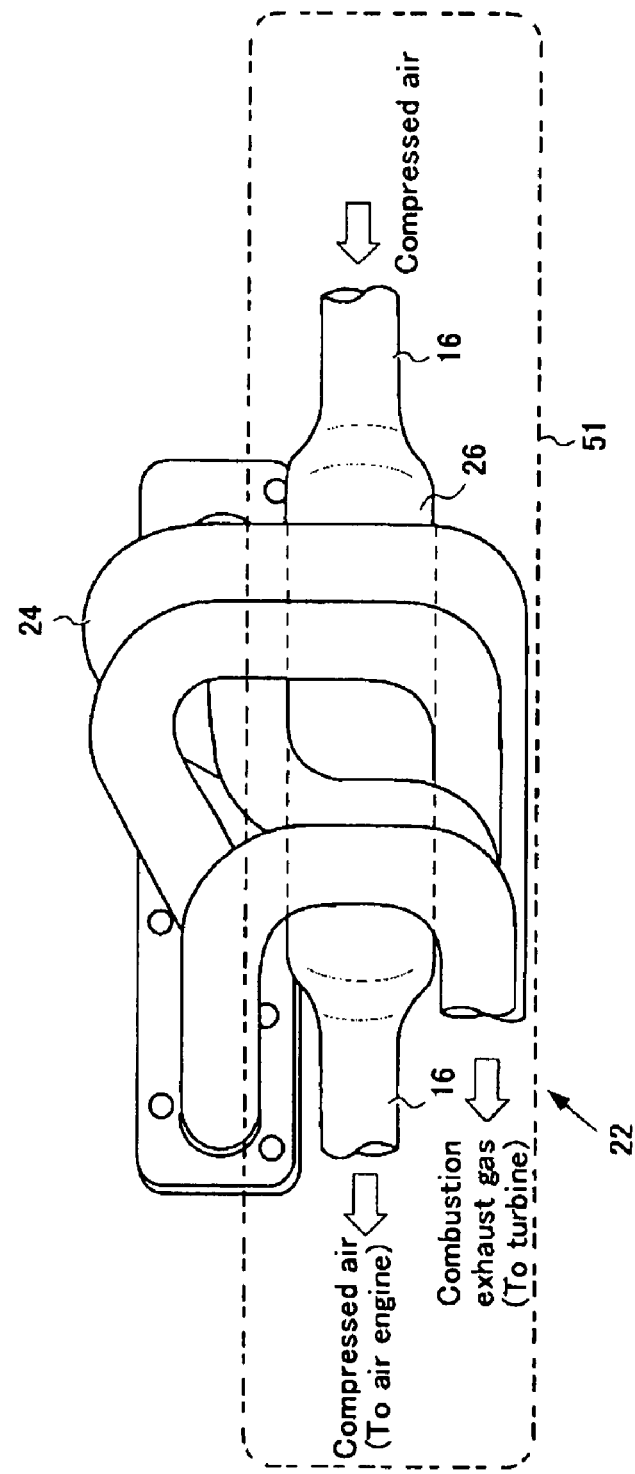
FIG. 3 A perspective view for explaining a heating mechanism.

The combustion exhaust gas discharged from the combustion chamber of the engine 2 is led to a turbine 4 of the turbocharger 8 through a manifold. As shown e.g. in FIG. 3 or a schematic diagram for explaining a heating mechanism, the chamber portion 26 (the driving air supply pipe 16) is adjacently arranged in the manifold 24 located immediately after the high-temperature engine combustion chamber. Further the chamber portion 26 and the manifold 24 located immediately after the engine combustion chamber are integrally covered around the insulation material 51 shown with dotted line so that heat is further efficiently transferred from the manifold 24 to the chamber 26. In a heating mechanism 22 formed of this structure, volume of the camber portion 26 is increased by decreasing gas pressure whereas temperature of the compressed air slightly decreased is increased by utilizing combustion exhaust gas in this heating mechanism 22, thereby increasing the gas pressure again.

It is also preferable to form a plural heat absorption fans around the chamber portion 26 to more efficiently transfer heat to the compressed air inside the camber portion 26 (not shown).

Further, the chamber portion 26 (driving air supply pipe 16) may be arranged inside the manifold 24 to directly contact combustion exhaust gas with the chamber portion 26, thereby heating the compressor (not shown).

Next, the generating system 10 described above is explained.

The combustion exhaust gas of approximately 800 to 1,000° C. discharged from the engine 2 to each cylinder (combustion chamber) is led to the turbocharger 8 by the manifold 24 for leading the combustion exhaust gas. The combustion exhaust gas introduced to the turbine 4 rotates a compressor wheel linked with the shaft 37 by rotating a turbine wheel. Exterior air is inspired into the compressor 6 of the turbocharger 8 by rotation of the compressor wheel and thus inspired exterior air is compressed and subsequently discharged. Although the exterior air immediately before being inspired in the compressor 6 is approximately 100° C., the exterior air (compressed air) discharged from the compressor becomes approximately 500 to 700° C. by temperature increase due to compression and heat transfer from the turbine 4.

The compressed air discharged from the compressor 6 of the turbocharger 8 is shared and distributed to the driving air supply pipe 16 and the combusting air supply pipe 18 that are branched. The compressed air led to the driving air supply pipe 16 further increases to approximately 800° C. by heat transfer from the manifold 24 in the chamber portion 26 and becomes the state of high pressure of approximately 5 to 10 kgPa. On the other hand, the compressed air let to the combusting air supply pipe 18 is cooled by the intercooler 49 to decrease volume and improve air density.

Thus temperature-increased compressed air in the chamber portion 26 is retained and sent to the air engine 12 through the driving air supply pipe 16 to drive the air engine. On the other hand, thus cooled compressed air by the intercooler 49 is sent to the engine 2 through the combusting air supply pipe 18 for combusting fuel to generate high power.

The rotational force thus generated by the drive of the air engine 12 is transmitted to the generator 14 by a shaft drive 47 (or belt drive) having length of several tens of centimeters and the generator 14 generates electricity by the rotational force. This shaft drive 47 (or belt drive) also functions to prevent from heat effect on a permanent magnet of the generator 14 by forming a certain distance between the high-temperature air engine 12 and generator 14.

Thus, in the generating method and the generating system utilizing combustion exhaust gas of this embodiment, the turbocharger is driven by combustion exhaust gas that is often wasted and the air inspired from outside to the compressor of the turbocharger is compressed. Besides the air is utilized as power of the air engine by utilizing the exhaust heat of the combustion exhaust gas to heat the inspired and compressed external air (compressed air) and expand the compressed air (further increasing gas pressure). Thus the air engine is efficiently driven by a great power and generation is efficiently operated by thus generated rotational force. That means, in general chargers (devices for compressing air supplied to the engine) it is not preferable that compressed air becomes high temperature. On the contrary it is a subject matter of the present invention that the compressed air is positively heated to expand and boost, thereby utilizing as power of the air engine.

Although the compressed air of the turbocharger 8 is shared and distributed to the driving air supply pipe 16 and the combusting air supply pipe 18 in this embodiment, a configuration where the combusting air supply pipe is not provided and the compressed air compressed and heated in the turbocharger is entirely sent to the air engine 12 is also possible as matter of fact.

Embodiment 2

Figure 4:
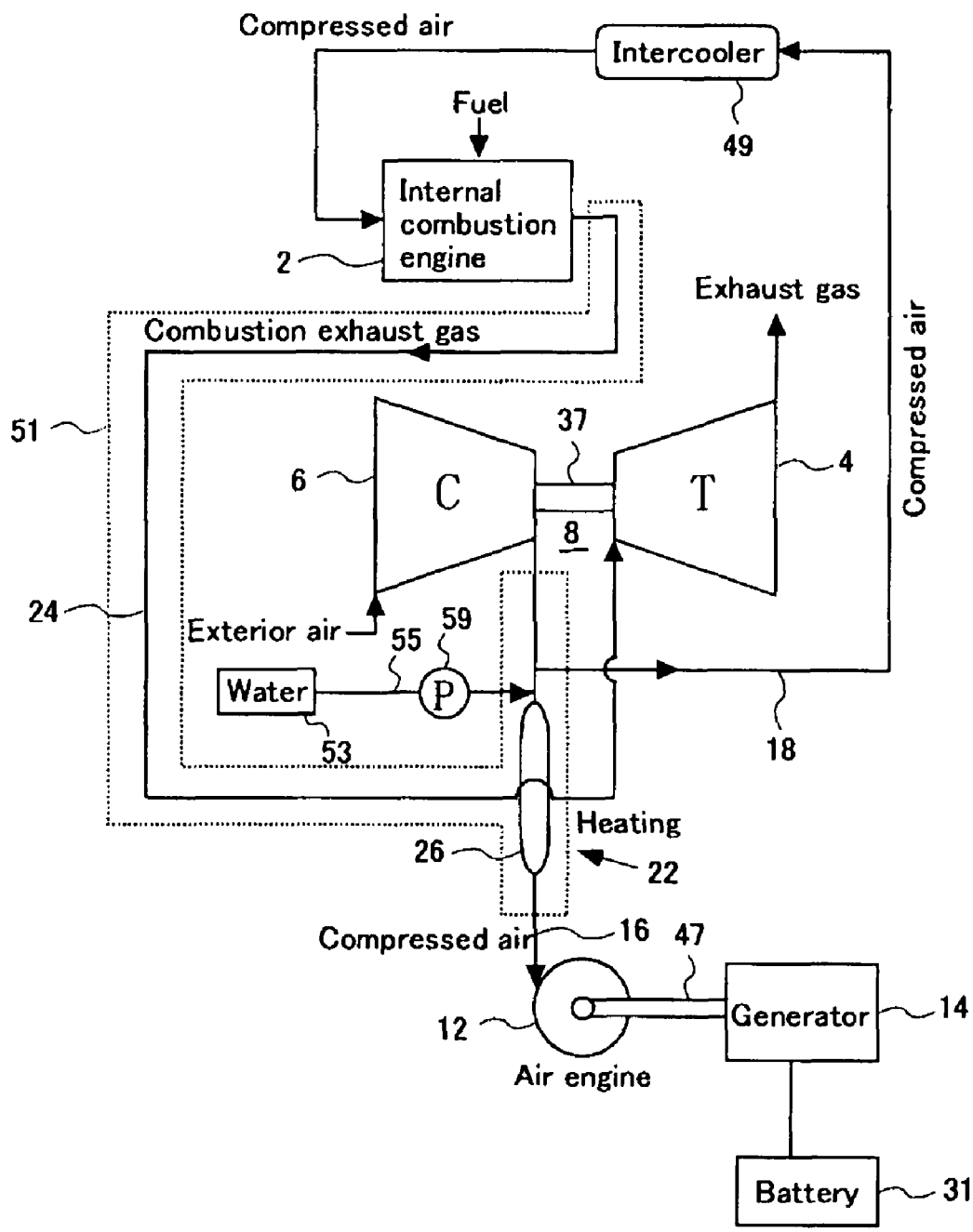
FIG. 4 A block diagram for explaining a configuration of a generating system utilizing combustion exhaust gas of Embodiment 2.

FIG. 4 is a schematic diagram for showing a generating system utilizing combustion exhaust gas of Embodiment 2. With respect to the configuration similar to the Embodiment 1, the similar numeral reference is put to omit repetition of explanation.

A generating system 10 of Embodiment 2 is added with a small amount of water inside the driving air supply pipe 16 of the generating system explained in Embodiment 1.

A portion in front of the chamber portion 26 that is a part of the driving air supply pipe 16 is attached with a water pipe 55 linking to a water tank 53 provided outside. And a nozzle passing through the driving air supply pipe 16 is provided in a connection between the water pipe and the driving air supply pipe 16. And a pump 59 for spraying water inside the driving air supply pipe 16 of high pressure is provided in a path of the water pipe 55.

From the water tank 53, water is sprayed inside the driving air supply pipe 16 through the water pipe 55 at approximately 0.05 cc to 1 cc per second. Thus sprayed water is vapor exploded by contacting with the driving air supply pipe 16 and the compressed air at high temperature. The compressed air discharged from the compressor 6 of the turbocharger and distributed to the driving air supply pipe 16 increases pressure by water vapor explosion of water sprayed from the nozzle in the front of the chamber portion 26 and temporarily decreases temperature slightly on the other hand. Whereas, in the chamber portion 26, the air is heated to 800° C. by heat transfer from the manifold 24 and becomes in the sate of high pressure of approximately 10 kPa again. Thus volume and pressure of gas (compressed air and vapor) flowing inside the driving air supply pipe 16 increase and therefore energy for driving the air engine 12 increases.

As described above, in the generating method and the generating system 10 that utilize combustion exhaust gas and the generating system of this embodiment, it can further improve generation efficiency compared with the generating system of Embodiment 1 by adding a configuration where a small amount of water is supplied into the driving air supply pipe.

With respect to the generating method and the generating system that utilize combustion exhaust gas of the present invention, of course the invention is not limited to the mode of the embodiments of the above described invention and may be variously modified within the subject matter of the present invention, as long as generation is performed using a turbocharger and utilizing gas pressure and exhaust heat of the combustion exhaust gas discharged from the combustion engine.

INDUSTRIAL APPLICATION

The generating system of the present invention is developed for main purpose of mounting on vehicles such as hybrid passenger cars and trucks. However besides application to mount on the vehicles, motion energy generated in the combustion engine is utilized as primary energy, gas pressure of the combustion exhaust gas and exhaust heat are utilized as secondary energy to generate electricity, and some are utilized as generating systems fixed on the ground. In such cases, still high temperature air after driving the air engine may be utilized to produce for example hot water.

What is claimed is:

1. A generating method utilizing combustion exhaust gas using a turbocharger (8) having a turbine (4) that is driven by gas pressure of combustion exhaust gas of an internal combustion engine (2) and a compressor (6) that is driven by rotational force generated by the turbine and compresses air inspired from outside, an air engine (12) generating rotational force by air pressure as a power source, and a generator (14) converting the rotational force thus generated by the air engine to electric power, comprising steps of compressing the air inspired from outside by the compressor of the turbocharger and heating the air by the turbine heat at high temperature, further raising temperature heat of the compressed air thus generated by the turbocharger by utilizing the combustion exhaust gas exhausted from the internal combustion engine, inside a driving air supply pipe (16) that leads the compressed air to the air engine, subsequently leading the compressed air to the air engine as a power thereof, and
generating electricity by the generator.

2. The generating method utilizing combustion exhaust gas according to claim 1, wherein the compressed air generated in the turbocharger (8) is shared and distributed for use of combusting the internal combustion engine (2) and for driving the air engine (12).

3. The generating method utilizing combustion exhaust gas according to claim 1, wherein, in a driving air supply pipe (16) for leading the compressed air to the air engine (12), temperature of the compressed air generated in the turbocharger (8) is raised using combustion exhaust gas exhausted from the internal combustion engine.

4. The generating method utilizing combustion exhaust gas according to claim 1, wherein a small amount of water is introduced from outside into inside of the driving air supply pipe (16).

5. The generating method utilizing combustion exhaust gas according to claim 2, wherein, in a driving air supply pipe (16) for leading the compressed air to the air engine (12), temperature of the compressed air generated in the turbocharger (8) is raised using combustion exhaust gas exhausted from the internal combustion engine.

6. The generating method utilizing combustion exhaust gas according to claim 2, wherein a small amount of water is introduced from outside into inside of the driving air supply pipe (16).

7. A generating system utilizing combustion exhaust gas comprising:
a turbocharger (8) having a turbine (4) that is driven by gas pressure of combustion exhaust gas of an internal combustion engine (2) and a compressor (6) that is driven by rotational force generated by the turbine and compresses air inspired from outside;
an air engine 12 that converts air pressure supplied from an driving air supply pipe (16) for leading the compressed air generated in the turbocharger to rotational force; and
a generator (14) converting the rotational force generated by the air engine to electric power, and
a heating mechanism (22) for raising temperature of he compressed air thus generated by the turbocharger by utilizing heat of the combustion exhaust gas exhausted from the internal combustion engine in a path of the driving air supply pipe.

8. The generating system utilizing combustion exhaust gas according to claim 7, further comprising a combusting air supply pipe (18) for supplying the compressed air generated in the turbocharger (8) to the internal combustion engine (2) as combusting air.

9. The generating system utilizing combustion exhaust gas according to claim 7, wherein a heating mechanism (22) for raising temperature by utilizing heat of the combustion exhaust gas is further provided in a path of the driving air supply pipe (16) for leading the compressed air generated in the turbocharger (8) to the air engine (12).

10. The generating system utilizing combustion exhaust gas according to claim 7, wherein the heating mechanism (22) is arranged in such manner that a driving air supply pipe (16) is adjacent to a manifold (24) for leading the combustion exhaust gas from the internal combustion engine (2) to the turbine (4).

11. The generating system utilizing combustion exhaust gas according to claim 7, the heating mechanism (22) is arranged in such manner that the combustion exhaust gas exhausted from the internal combustion engine (2) contacts the driving air supply pipe (16).

12. The generating system utilizing combustion exhaust gas according to claim 7, wherein the air engine and the generator are disposed apart, the rotational force generated by the air engine (12) is transmitted to the generator (14) by a belt drive or a shaft drive.

13. The generating system utilizing combustion exhaust gas according to claim 7, wherein a chamber portion (26) for temporarily storing the compressed air at high temperature and high pressure is further provided in a path of the driving air supply pipe (16).

14. The generating system utilizing combustion exhaust gas according to claim 8, wherein a heating mechanism (22) for raising temperature by utilizing heat of the combustion exhaust gas is further provided in a path of the driving air supply pipe (16) for leading the compressed air generated in the turbocharger (8) to the air engine (12).

15. The generating system utilizing combustion exhaust gas according to claim 8, wherein the heating mechanism (22) is arranged in such manner that a driving air supply pipe (16) is adjacent to a manifold (24) for leading the combustion exhaust gas from the internal combustion engine (2) to the turbine (4).

16. The generating system utilizing combustion exhaust gas according to claim 8, the heating mechanism (22) is arranged in such manner that the combustion exhaust gas exhausted from the internal combustion engine (2) contacts the driving air supply pipe (16).

17. The generating system utilizing combustion exhaust gas according to claim 8, wherein the air engine and the generator are disposed apart, the rotational force generated by the air engine (12) is transmitted to the generator (14) by a belt drive or a shaft drive.

18. The generating system utilizing combustion exhaust gas according to claim 8, wherein a chamber portion (26) for temporarily storing the compressed air at high temperature and high pressure is further provided in a path of the driving air supply pipe (16).

19. The generating system utilizing combustion exhaust gas according to claim 9, wherein the air engine and the generator are disposed apart, the rotational force generated by the air engine (12) is transmitted to the generator (14) by a belt drive or a shaft drive.

20. The generating system utilizing combustion exhaust gas according to claim 9, wherein a chamber portion (26) for temporarily storing the compressed air at high temperature and high pressure is further provided in a path of the driving air supply pipe (16).

* * * * *